United States Patent [19]
Carpenter et al.

[11] 3,835,183
[45] Sept. 10, 1974

[54] SULFONATED AROMATIC PRODUCT AND METHOD OF MANUFACTURING THE SAME

[75] Inventors: David B. Carpenter, Ashland, Ky.; Jane W. Mittendorf, Fort Lee, N.J.

[73] Assignee: Ashland Oil, Inc., Ashland, Ky.

[22] Filed: Dec. 13, 1971

[21] Appl. No.: 207,676

Related U.S. Application Data

[63] Continuation of Ser. No. 696,551, Jan. 9, 1968, abandoned.

[52] U.S. Cl. .............................. 260/505 C, 423/460
[51] Int. Cl. ......................................... C07c 143/74
[58] Field of Search .............................. 260/505 C

[56] References Cited
UNITED STATES PATENTS

2,199,131  4/1940  Flett................................ 260/505 C

*Primary Examiner*—Leon Zitver
*Assistant Examiner*—A. Siegel

[57] ABSTRACT

A normally pumpable, sulfonated aromatic product, highly useful as a material for the production of activated carbon, and the method of manufacturing this product, including reacting a highly aromatic hydrocarbonaceous material containing in excess of about 50 percent by volume of aromatic hydrocarbons and preferably in excess of 75 percent aromatic hydrocarbons, such as coal tars and pitches and preferably condensed nuclear hydrocarbons obtained as a bottoms product of the hydrodealkylation of coal tars, catalytically cracked light cycle oils, reformer products, and the like, with a spent alkylation acid, containing at least 50 percent and preferably at least 75 percent by volume of sulfuric acid, preferably obtained as a by-product of the reaction of isoparaffins, such as isobutane and/or isopentane, with an alkylating reactant, particularly an olefin such as propylene, various butylenes, various amylenes and other higher boiling olefins, to produce normally liquid paraffins as high octane blending stock for gasolines, at ambient pressures and at a temperature from ambient temperature to about 275°F and above the melting point of the hydrocarbonaceous feed, where the hydrocarbon feed is a normally semi-solid material at ambient temperatures whereby a sulfonated product is obtained which can be readily handled and shipped at temperatures above 175°F without solidifying; but which will, when carbonized and activated, produce a superior activated carbon material. In one form of the invention, the hydrocarbonaceous aromatic feed material is prepared by subjecting coal or the like to carbonization in the absence of oxygen at a temperature of about 600° to 2400°F and a pressure of about 10 to 100 psig., separating gases and solid coke from a liquid product of the carbonization and thereafter subjecting the liquid to sulfonation as outlined above. The normally pumpable, sulfonated aromatic product of the present invention is also valuable in the production of activated carbon pellets or briquettes by mixing ground carbonaceous materials such as coal, lignite, nutshells, fruit pits, wood and charcoal, etc. with the sulfonated aromatic product of the present invention and thereafter carbonizing and activating the formed pellets or briquettes.

8 Claims, 2 Drawing Figures

INVENTORS
DAVID B. CARPENTER
JANE W. MITTENDORF

BY *Walter H. Schneider*

ATTORNEY

SULFONATED AROMATIC PRODUCT AND METHOD OF MANUFACTURING THE SAME

FIELD OF THE INVENTION

This is a continuation of application Ser. No. 696,551 filed Jan. 9, 1968, now abandoned.

The present invention relates to a method of sulfonating hydrocarbonaceous materials and the product thereof. In a more specific aspect, the present invention relates to a method of sulfonating condensed nuclear hydrocarbonaceous materials and a product useful for production of activated carbon and as a binder for the production of activated carbon pellets or briquettes.

SUMMARY OF THE PRIOR ART

Activated carbon is useful for many and varied purposes. For example, it may be used in the dechlorination of over-chlorinated water, for the decolorization of sugar solutions, for the adsorption of vapors and gases, such as chemical warfare gases, and gases and vapors escaping from industrial processes, and in the decolorization, purification and separation of hydrocarbon liquids, such as petroleum and coal refinery streams.

The carbon material suitable for use in adsorption-type operations can be produced in a variety of ways from a variety of materials.

For example, an excellent material can be produced by the carbonization of coal, wood, peat, lignite, nutshells, fruit pits, bone, blood, and the like.

Activation of the resultant carbon is usually achieved by heating to high temperatures of about 1000° to 1850°F, usually 1300° to 1650°F., in the presence of steam, carbon dioxide, flue gases, or combinations of these or other gases. This activation produces a material having a porous particle structure. In some cases, hygroscopic substances, such as zinc chloride and/or phosphoric acid or sodium sulfate, are added prior to destructive distillation or activation, to increase the adsorptive capability. The carbon content of active carbons ranges from about 10 percent for bone charcoal, to 98 percent for some of the wood chars. The internal surface area of active carbon has been estimated to be up to about 5000 sq. ft. per gram. The density ranges from about 0.08 to nearly 0.5.

Charcoal suitable for subsequent activation can also be produced by treating pitches and asphalts of mineral, animal or vegetable origin with concentrated aqueous sulfuric acid, for example 95 percent acid, at a temperature in the neighborhood of about 320° to 340°F. The product is thereafter freed of excess sulfuric acid by washing with water and sometimes neutralized with an alkaline solution.

A major source of activated carbon is sulfuric acid sludges or residual products, such as those obtained from oil refining operations, for example, sulfuric acid treatment of gasoline or higher-boiling distillates, and mainly from sulfuric acid or oleum treatment of phenol extracted oils in the lubricating oil range for the manufacture of white oils and petroleum sulfonates, and from the paper-making industry, such as waste sulfite liquors, etc. These sludges are thereafter subjected to settling to remove any aqueous acid which separates from a thick tarry residue. The residue is then carbonized by mixing the sludge with a petroleum oil, such as low boiling normally parafinic hydrocarbons which cannot be sulfonated, for example, paraffins containing five to eight carbon atoms per molecule, and heating the mixture to a carbonization temperature in the neighborhood of about 750° to 1200°F.

Unfortunately, the supply of acid sludges suitable for the production of activated carbon is rather limited and, as a result, the cost of this starting material continues to increase rapidly and the end products vary depending on the character of the acid treatment. It has also been assumed that the character of the sludge treated is immaterial but the quality of the end product does, in fact, vary widely. Similarly, activated carbon products derived from vegetable materials, such as nutshells and the like, are also in limited supply and production from these sources is not favored. Finally, the production of carbon from normally solid asphalts and pitches of petroleum or coal origin is subject to numerous economic and practical difficulties. For example, the use of concentrated aqueous sulfuric acid is, in and of itself, extremely expensive. Further, little or no attention has heretofore been paid to the type of starting material utilized and consequently, the products have, in many cases, been of inferior and inconsistent properties.

SUMMARY OF THE INVENTION

In view of the above, it is an object of the present invention to provide an improved process for the production of a normally pumpable, carbonizable and activatable hydrocarbonaceous material and the product thereof. Another and further object of the present invention is to provide carbonizable and activatable hydrocarbonaceous material, which can readily be melted, and which is suitable for conversion to an activated carbon of high quality. A further object of the present invention is to provide an improved method of sulfonating hydrocarbonaceous materials and the product thereof. Another object of the present invention is to provide an improved method for the sulfonation of condensed nuclear hydrocarbonaceous materials and the product thereof. A still further object of the present invention is to provide an economical method for the sulfonation of a hydrocarbonaceous material and the product thereof. Yet another object of the present invention is to provide an improved process for the sulfonation of a bottoms product of a hydrodealkylation reaction and the product thereof. Another and further object of the present invention is to provide an improved process for the sulfonation of products of the carbonization of coal. Still another object of the present invention is to provide an improved process for the sulfonation of hydrocarbonaceous materials, which includes contacting the hydrocarbonaceous material with a spent alkylation acid. A still further object of the present invention is to provide an improved process for the sulfonation of hydrocarbonaceous material, which includes contacting the hydrocarbonaceous material with a spent alkylation acid at relatively low temperatures. A further object of the present invention is to provide an improved process for the sulfonation of hydrocarbonaceous materials which includes contacting the hydrocarbonaceous material with a spent alkylation acid at a temperature between room temperature and 215°F. Another object of the present invention is to provide an improved process for producing a normally liquid, carbonizable and activatable material by contacting a preponderantly condensed nuclear hydrocarbonaceous material with a spent alkylation acid and the product thereof. A further object of the present invention is to provide an improved process for the production of a carbonizable and activatable hydrocarbonaceous material by contacting a hydrocarbonaceous material with a spent alkylation acid to produce a meltable composition, thereafter forming pellets or briquettes from a normally-solid hydrocarbonaceous material and the normally semi-solid sulfonated composition, and subsequently carbonizing and activating the pellets or briquettes.

These and other objects and advantages of the present invention will be apparent from the following detailed description when read in conjunction with the drawings, wherein.

Quite surprisingly, it has been discovered, in accordance with the present invention, that all of the previously mentioned disadvantages of the prior art may be overcome by contacting a preponderantly condensed nuclear hydrocarbonaceous material with a spent alkylation acid to form a normally pumpable sulfonated aromatic composition. In addition to the economics of this process, it has also been found that the sulfonated, aromatic composition, when carbonized and thereafter activated, results in the production of a superior activated carbon.

DETAILED DESCRIPTION OF THE INVENTION

Figure 1:
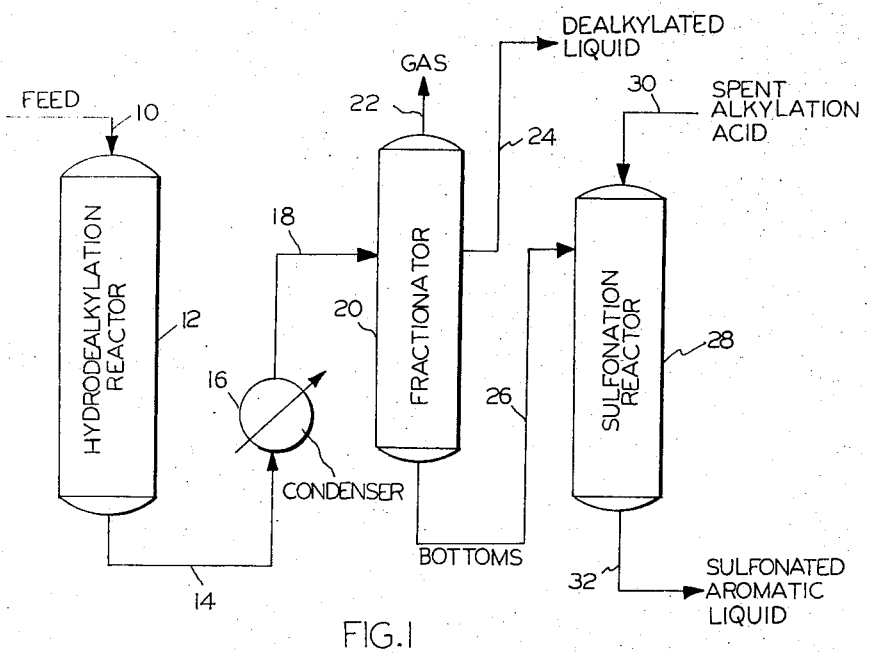
FIG. 1 shows a flow diagram of one aspect of the present invention.

In accordance with FIG. 1 of the drawings, a feed material is introduced through line 10 to hydrodealkylation reactor 12. The total product of hydrodealkylation reactor 12 is discharged through line 14 to condenser 16. The effluent of condenser 16 passes through line 18 to fractionator 20. In fractionator 20, the hydrodealkylation product is separated into a gas, which is discharged through line 22, the dealkylated liquid, discharged through line 24, and a bottoms product, discharged through line 26. The bottoms product passing through line 26 is charged to sulfonation reactor 28, where it is contacted with spent alkylation acid introduced through line 30. The normally liquid sulfonated aromatic product is discharged from the sulfonation reactor through line 32.

Figure 2:
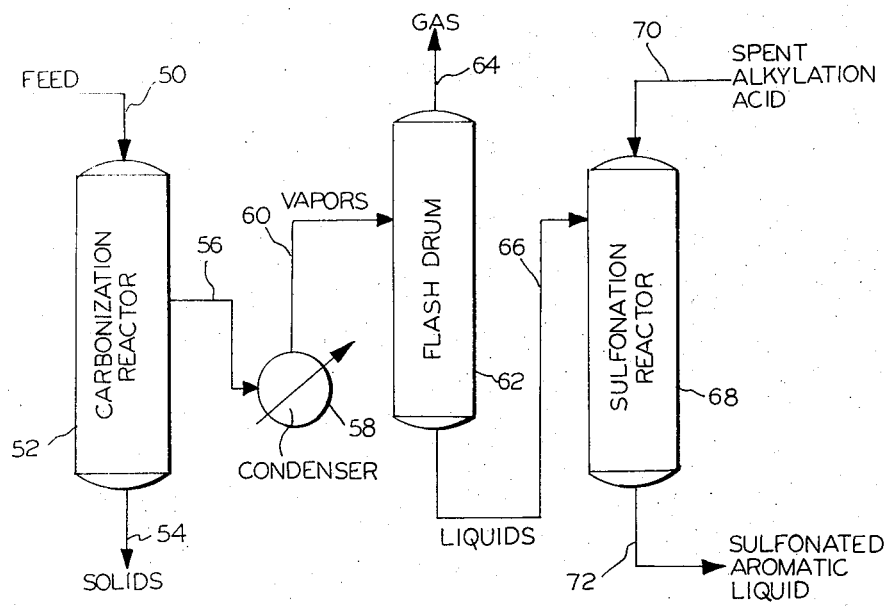
FIG. 2 shows a flow diagram of an alternative method of practicing the present invention.

In an alternate operation, as illustrated in FIG. 2, feed material is introduced through line 50 to carbonization reactor 52. From carbonization reactor 52, solid product is discharged through line 54 whereas liquids, vapors and gases are discharged through line 56. The liquids, vapors and gases pass to condenser 58 and thence through line 60 to flash drum 62. In flash drum 62, gaseous and light liquid materials are separated and discharged through line 64 while the liquid product is discharged through line 66. The liquid product from line 66 is passed to sulfonation reactor 68 where it is contacted with spent alkylation acid introduced through line 70. The sulfonated aromatic liquid product is discharged from the sulfonation reactor 68 through line 72. The feed material to the hydrodealkylation unit illustrated in FIG. 1, may be derived from any source of hydrocarbonaceous material, including coal, petroleum, etc. For example, coke oven or coal tar oils and pitches, derived from the carbonization of coal, liquids extracted from coal by solvent extraction with tetralin, decalin, etc., and liquids obtained by combinations of solvent extraction and carbonization may be utilized. This feed material to the hydrodealkylation unit may also be a process stream from a petroleum or coal refinery, such as catalytic reformate, by contacting petroleum or coal liquids with a precious metal catalyst, such as platinum, at a temperature of about 900° to 950°F, a pressure of about 200 to 600 psig., at a weight hourly space velocity between about 1.5 and 5 and using a hydrogen-to-hydrocarbon ratio between about 3 to 1 and 10 to 1. A higher boiling reformate fraction, boiling between about 400° and 600°F. is preferred. Still another feed for the hydrodealkylation reactor may include a reformer product, boiling between about 400° and 600°F, which has beeen subjected to solvent extraction, such as by the "UDEX" process (triethylene glycol and water). Other petroleum fractions which may be used as a feed stock include kerosene, which has been extracted with an aromatic selective solvent, such as sulfur dioxide, a catalytic cracking light cycle oil which has been subjected to solvent extraction, as with sulfur dioxide, or a catalytic cracked light cycle oil which has been subjected to hydrocracking.

The hydrodealkylation unit is preferably a catalytic hydrodealkylation, for example, a catalytic operation utilizing a catalyst containing from 10 to 15 percent chromia on gamma alumina. A highly effective catalyst of this character is designated G-41 by its manufacturer, the Girdler Construction Division, P.O. Box 174, Louisville, 1, Kentucky. When utilizing such a catalyst, the hydrodealkylation may be carried out at temperatures between about 1000° and 1400°F, preferably between about 1250° and 1350°F; at a pressure of about 100 to 1000 psig., and preferably between 400 and 1000 psig.; at a weight hourly space velocity between about 0.5 and 5, and preferably between about 0.5 and 3; and at a hydrogen-to-hydrocarbon ratio of about 3 to 1 and 10 to 1, and preferably at about 6 to 1 and 7 to 1. It is also possible to carry out the hydrodealkylation without a catalyst, in which case the temperature is also maintained above about 1200°F, the pressure above about 500 psig., and a hydrogen-to-hydrocarbon ratio of about 1400 to 1900 cubic feet of hydrogen per barrel of feed is used.

Preceding the hydrodealkylation unit, the feed material is desulfurized, deoxygenized, and denitrogenized to a certain extent and monocyclic aromatics and condensed nuclear hydrocarbons are dealkylated to produce valuable benzene, toluene, xylene and naphthalene. The product of the hydrodealkylation unit includes a normally gaseous material and a normally liquid material. The residual light gases are drawn off and used as a plant fuel. The liquid fraction is then separated into a dealkylated fraction containing benzene, toluene, xylene and a higher-boiling product or bottoms product normally utilized as a fuel oil stock. This higher-boiling or bottoms product boiling above naphthalene or about 450°F comprises predominantly alkyl monocyclic aromatics and alkyl condensed nuclear hydrocarbons and condensed nuclear hydrocarbons. For example, a bottoms product from a catalytic hydrodealkylation unit operating on a reformate feed had a chromatographic analysis as follows:

0.5% naphthalene, 29.9% acenaphthene,
9.6% methylnaphthalene, 5.5% phenanthrene,
15.4% dimethylnaphthalene, 27.2% phenylnaphthalene,
11.9% naphthacene and heavier.

The cut point between the dealkylated liquid fraction and the bottoms fraction depends primarily on the type of feed and the dealkylated product to be recovered. Where benzene-toluene-xylene are the dealkylated end products, the cut point would be about 300° to 350°F. Where naphthalene is the primary end product, the cut point should be about 400° to 600°F, and ideally 440° to 525°F.

The bottoms product of the hydrodealkylation unit is then treated at ambient pressure, and preferably, at ambient temperature for a period sufficient to sulfonate the condensed nuclear hydrocarbon aromatic material and produce a semi-solid, sulfonated aromatic product. Sulfonation is effected by a spent alkylation acid, such as that produced as a by-product of the alkylation reactions for the production of octane isomers as gasoline blending stocks. For example, spent alkylation acid is produced as a result of a reaction of isoparaffins, particularly isobutane and/or isopentane, with an alkylating reactant, particularly an olefin, such as propylene, various butylenes, various amylenes, and other higher boiling olefins, to produce normally liquid isoparaffins which have high octane numbers and are quite valuable constituents of motor and aviation gasolines. In such alkylation processes, the reactants are intimately contacted at temperatures between about 50° and 150°F, and under sufficient pressure to maintain the reactants in a liquid phase, while utilizing concentrated sulfuric acid as a catalyst. A reaction time of about 1 to 30 minutes is utilized and a mole ratio of paraffin to olefin between about 3 to 1 and 20 to 1, and sometimes as high as 100 to 1, may be used. The resulting reaction effluent is then passed to a settling zone where the liquid hydrocarbon phase and a heavier liquid sulfuric acid-rich phase are formed and separated. The heavy liquid phase containing sulfuric acid is subjected to fractional distillation to remove sulfuric acid which is recycled directly to the alkylation zone. During the course of the reaction, the acid generally becomes contaminated with $C_2$ to $C_4$ olefins which are sulfonated by the acid and/or polymerized and eventually the concentration of the acid drops to a point at which it is no longer suitable for use in the alkylation reaction. This acid must then be replaced with fresh acid. The by-product or discarded spent acid is the material referred to herein as spent alkylation acid. The spent alkylation acid consists essentially of $C_2$ to $C_4$ olefins, isobutanes, isopentanes, olefin polymers and presumably sulfonated products of these materials. The acid concentration is normally in the range of about 88 to 90 percent by volume. One advantage, which has been noted in the present invention, is that the olefin content of the alkylation acid appears to add strength to an activated carbon produced from the sulfonated aromatic material. The spent alkylation acid utilized in the present invention should have an acid concentration above about 50 percent, and preferably above about 75 percent.

The ratio of bottoms liquid to spent alkylation acid, in a sulfonation reactor, is not critical and may vary between about 3 to 7 and 9 to 1. The temperature in the sulfonation reactor will depend, to a certain extent, upon the type of feed material. In the present instance, where the feed to the sulfonation reactor is a bottoms product from the hydrodealkylation operation, the temperature may vary anywhere from the melting point of the hydrocarbon up to about 275°F, preferably this temperature is from the melting point of the hydrocarbon to 250°F. It has been found, in accordance with the present invention that foaming, which occurs during the reaction, is reduced at the higher temperatures, but quite satisfactory results can be obtained at the melting point of the hydrocarbon. Further, it has been found that if the temperature of the sulfonation reaction exceeds about 275°F, the material decomposes, thereby defeating a major purpose of the process of the present invention; namely, the production of an easily handled, easily melted, carbonizable and activatable, sulfonated aromatic material.

When practicing the invention, according to the scheme of FIG. 2, a wide variety of feed materials may be introduced to the carbonization reactor. Specifically, any liquid, semi-solid or solid hydrocarbonaceous material may represent the feed to the carbonization reactor. A preferred material is pulverized and washed coal. Since coal contains predominant amounts of aromatic materials, the major portion of which is condensed nuclear hydrocarbons, it is an excellent feed material capable of ultimately producing substantial volumes of the sulfonated aromatic pumpable material of the present invention. Other liquid, semi-solid and solid hydrocarbonaceous materials, rich in aromatics, and particularly condensed nuclear hydrocarbons, may also be employed, alone or in combination, for example, petroleum asphalts, vacuum still bottoms, heavy coal liquids, coal pitches, and the like. The coal liquids, may be derived from a prior treatment of raw coal, such as the solvent extraction of pulverized coal with solvents, such as decalin, tetralin, and the like, or the residual solids from such a solvent extraction operation together with heavy residual liquids may be used as a feed. Similarly, a prior carbonization of coal may be practiced and the feed to the carbonization unit of the present invention may be residual solids, semi-solids and liquids from such an operation. Heavy residual liquids from shale oil retorting also have been found to contain substantial volumes of aromatics and could represent a feed to carbonization unit 52 of FIG. 2. In any event, whatever the feed to carbonization unit 52, this unit may be operated under low or high temperature conditions. Specifically, the carbonization involves heating the carbonaceous material, in the absence of air, to obtain a coke or a char and gaseous and liquid products. The temperature of operation may vary anywhere from 600° to 2400°F. Low temperature operations are normally considered to exist from 600° to 1300°–1400°F and high temperature carbonization exists above about 1300°–1400°F. At the low temperatures, small quantities of gaseous products and larger quantities of liquid and pitch products are produced. At the higher temperatures, there is an increase in the ratio of gas-to-liquid. The products of the carbonization comprise primarily a solid char or coke, which is, in itself, suitable for use as an adsorbent, a gas, a viscous liquid, generally referred to as coal tar, and a normally solid pitch, normally referred to as coal tar pitch and having a melting point of about 150°F. A typical liquid-solids product of low temperature carbonization comprises about 10 percent of what is called a light oil, about 21 percent of a so-called coal tar, about 35 percent coal tar pitch, and about 28.5 percent coke or char. These percentages depend upon the cut point of the various components, which cut points vary according to the experimenter or operator. Typically, what is termed coal tar light oil comprises primarily benzene, toluene and xylene, the end point of which may vary anywhere from about 340° to 360°F. The coal tar or heavy liquid fraction generally has an end point of about 660°F to as high as 750°F. The normal cut point is usually around 680°F. The coal tar pitch, of course, boils above the end point of the so-called coal tar fraction. The heavy liquid or coal tar fraction may be cut into a wide variety of other fractions, the names of which vary almost as widely as the number of fractions which can be made. In any event, this portion of the carbonization product is predominantly condensed nuclear hydrocarbons including phenols, naphthalene, anthracene and derivatives thereof. Of particular interest in accordance with the present invention is a cut known as creosote oil, boiling between about 390° and 750°F, and particularly a heavy creosote oil from which phenols and napthalene have been removed (boiling between about 520° and 600°F). The heavier fraction of the creosote boiling between about 520° and 600°F has been found to be an excellent feed to the sulfonation unit of the present invention. This creosote oil fraction normally contains varying amounts of naphthalene and anthracene, depending upon the initial boiling point and the end point, but primarily materials such as biphenyl, acenaphthene, methylnaphthalene, dimethylnaphthalene, etc. However, in accordance with FIG. 2 of the present drawings, the total liquid, semi-solid and solid pitch product of the carbonization unit is fed to the sulfonation unit after removing gases and char or coke.

When operating on product from the carbonization unit as shown in FIG. 2, the sulfonation reactor is operated in substantially the same way, as previously described in connection with operation on hydrodealkylation bottoms. However, where the feed includes coal tar pitch or consists of coal tar pitch, petroleum asphalts, or other normally solid materials, the sulfonation reaction should be carried out above the melting point of the solid. As previously indicated, the melting point of coal tar pitch is about 150°F, and therefore operation of the sulfonation reactor should be above this point. In any event, it has been found quite interestingly that irrespective of whether the feed is liquid, solid or a combination of solid and liquid, the final sulfonated aromatic product is a semi-solid substance which can be readily transported and handled at elevated temperatures (~175°F) without problems normally associated with materials of this type.

While the hydrodealkylation bottoms and the carbonization products referred to above are practically predominate in condensed nuclear hydrocarbons, other equivalent feeds may be employed so long as the feed to the sulfonator contains at least 50 percent aromatics, and preferably at least 75 percent aromatics, and that the aromatics predominate in polycyclic materials. One such material is a slurry oil extract, obtained by clarifying and thereafter solvent extracting a bottoms product from catalytic cracking.

In addition to carbonization and activation on the sulfonated aromatic product to produce activated carbon, it has also been found that this material may be used as a binder in the production of activated carbon pellets or briquettes from finely divided solid carbonaceous materials, which in and of themselves form activated carbon upon carbonization and activation. For example, ground coal, nutshells, fruit pits and like hydrocarbonaceous materials may be mixed with a suitable quantity of the sulfonated aromatic liquid of the present invention, formed into pellets or briquettes and thereafter carbonized and activated. This procedure, of course, eliminates duplication of the steps of carbonization and activation. However, where byproduct fines resulting from carbonization and activation of hydrocarbonaceous materials are available, these materials also may be formed into briquettes or pellets by mixing such fines with the sulfonated aromatic product of the present invention, pelleting and thereafter subjecting the material to carbonization and activation a second time. While additional carbonization and activation steps are required in this instance, the utilization of materials, which are normally not useful as such, to produce a high quality adsorbent justifies the additional processing.

The following examples illustrate the advantages of the present invention.

In a first series of tests, coal tar creosote oil boiling between about 520° and 600°F was treated with spent alkylation acid and also with aqueous sulfuric acid of the same strength. It is found that the alkylation acid reacted completely within a matter of hours at room temperature, whereas the aqueous acid required several days for complete reaction. This advantage in shortening the reaction time is obviously in addition to the pronounced economic advantage in using spent alkylation acid.

In another comparative test, a similar creosote oil fraction from coal tar was compared with a vacuum tower bottoms derived from petroleum and boiling in the same boiling range. It is found in these tests that creosote oil reacted much faster and more completely than the petroleum-derived material. Specifically, the vacuum bottoms left a waxy-oily layer which was paraffinic in nature. This waxy layer, upon activation to produce activated carbon, resulted in coking and thereby forming an undesired diluent in the final activated carbon product. The creosote oil also produced a sulfonator aromatic product having 39.5 percent fixed carbon as opposed to 20.5 percent for the vacuum bottoms, even though the feed materials contained 91.3 percent and 88.9 percent carbon, respectively.

We claim:

1. A method of producing a normally liquid, sulfonated aromatic product, comprising; contacting a feed material comprising a hydrocarbonaceous material, having a boiling point above about 350°F and containing at least about 50% by volume of polycyclic aromatic hydrocarbons with a spent alkylation acid resulting from the alkylation of $C_2$ to $C_5$ isoparaffins with olifins in the presence of sulfuric acid as a catalyst containing at least about 50 percent sulfuric acid at a temperature between ambient and 275°F and for a period sufficient to sulfonate said feed material.

2. A method in accordance with claim 1 wherein the feed material is a heavy liquid product of a hydrodealkylation reaction.

3. A method in accordance with claim 2 wherein the heavy liquid hydrodealkylation product is a material boiling above about 400°F.

4. A method in accordance with claim 1 wherein the spent alkylation acid is a by-product of the alkylation of isobutane with butylenes.

5. A product produced by the process of claim 1 wherein the feed material is a heavy liquid product of a hydrodealkylation reaction.

6. A product produced by the process of claim 2 wherein the heavy liquid hydrodealkylation product is a material boiling above the boiling point of naphthalene.

7. A product produced by the process of claim 1 wherein the spent alkylation acid is a by-product of the alkylation of isobutane with butenes.

8. A product produced by the process of claim 1.

* * * * *